April 18, 1967  R. R. BALAGUER  3,314,823
BATTERY PACK
Filed May 18, 1965  2 Sheets-Sheet 1
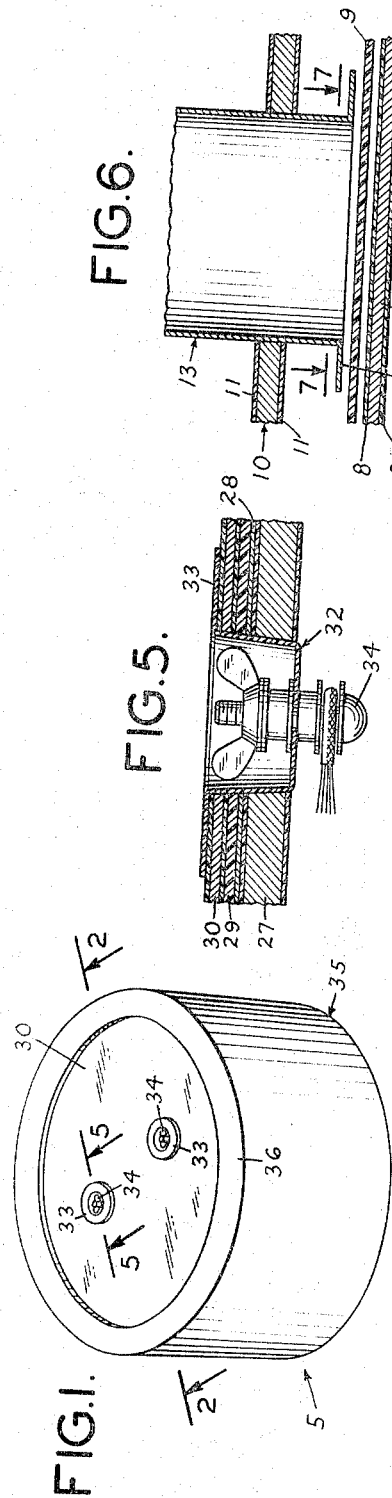
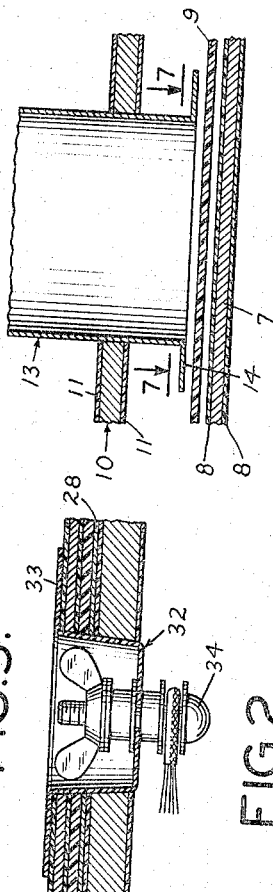
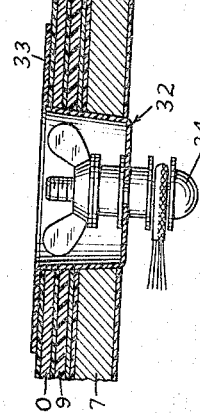
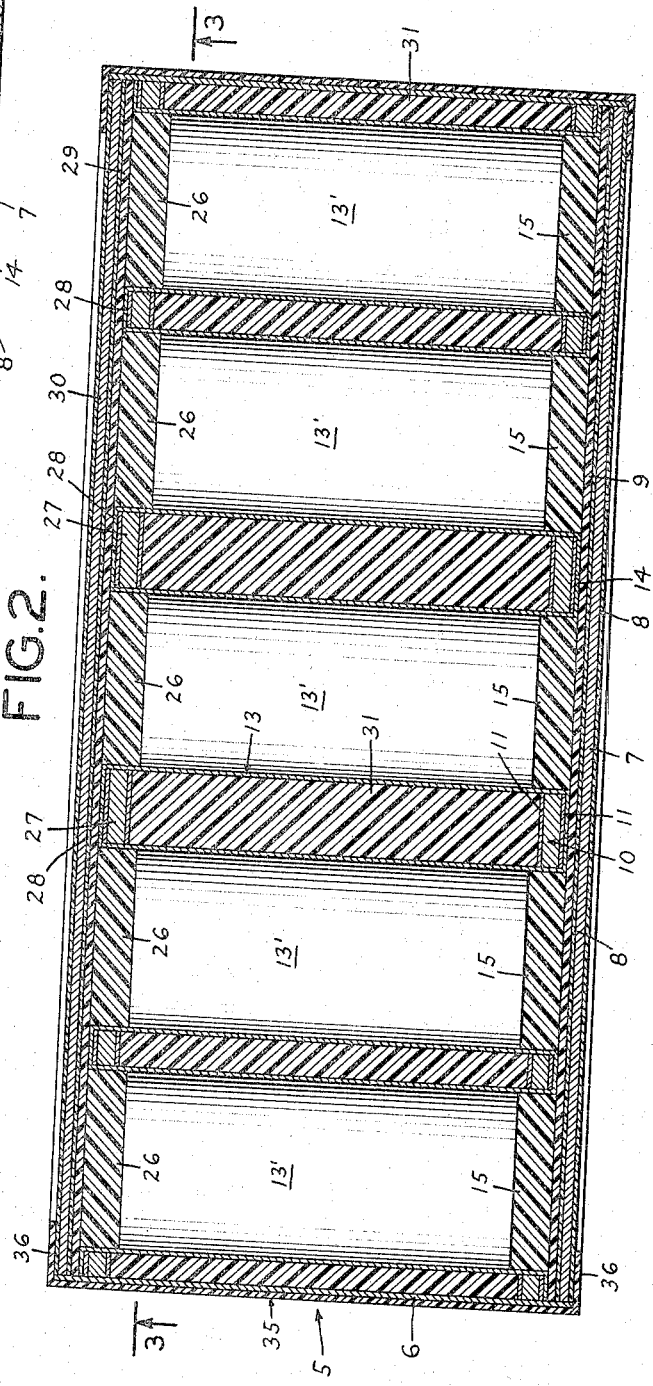

United States Patent Office 3,314,823
Patented Apr. 18, 1967

3,314,823
BATTERY PACK
Rodolfo Rodriguez Balaguer, Fort Lauderdale, Fla., assignor, by mesne assignments, to Patent Holding Corporation, Fort Lauderdale, Fla.
Filed May 18, 1965, Ser. No. 456,618
6 Claims. (Cl. 136—166)

The present invention relates to new and useful improvements in battery packs in general and particularly seeks to provide a multi-cell pack of waterproof and impact resistant construction.

Many of the modern portable electronic indicating or sensing devices that are used in oceanographic or other types of offshore observations are battery powered and are designed to be placed on location by being dropped from moving aircraft. Obviously the components of such devices must be of waterproof and impact resistant construction as must the power supply. These same qualities of impact resistance and water or weather proofness are of equal importance when such devices and their power supply are to be used in connection with land operations.

Therefore an object of this invention is to provide an impact resistant waterproof battery pack particularly suitable as a power supply for portable electronic devices in remote locations.

Another object of this invention is to provide a battery pack of the character stated which includes a plurality of battery cells maintained in predetermined spaced relationship.

Another object of this invention is to provide a battery pack of the character stated in which the individual cells are cushion mounted and collectively encased in a waterproof housing.

A further object of this invention is to provide a battery pack of the character stated in which the individual cells are contained within resin impregnated glass fiber cloth tubes with the voids between the tubes being filled by a non-rigid foamed plastic.

A further object of this invention is to provide a battery pack of the character stated in which the individual cells are arranged in concentric circles with their axes in spaced parallel alignment.

A further object of this invention is to provide a battery pack of the character stated which includes an annular shell having a height somewhat greater than the height of an individual cell, a disc closing the bottom of the shell, a perforated bottom spacer overlying the bottom disc and adapted to hold the impregnated glass cloth tubes and the individual cells in concentric circular arrangement, a perforated top spacer engaged with the tops of the tubes, and a disc closing the top of the shell, there being foamed plastic pads positioned within the perforations of the spacers to cushion the individual cells and to restrain them against axial movement.

Other and further objects, features and advantages of the invention will appear more fully from the following description of an embodiment of the invention taken in connection with the appended drawings, in which:

FIG. 1 is a perspective view of one form of battery pack constructed in accordance with this invention;

FIG. 2 is a vertical cross-section taken along the line 2—2 of FIG. 1;

FIG. 5 is an enlarged detail cross-section taken along the line 5—5 of FIG. 1 showing one of the connecting terminals;

FIG. 6 is an enlarged fragmentary vertical cross-section taken along the line 6—6 of FIG. 3 and shows the relative arrangement of certain of the components during assembly;

Figure 3:
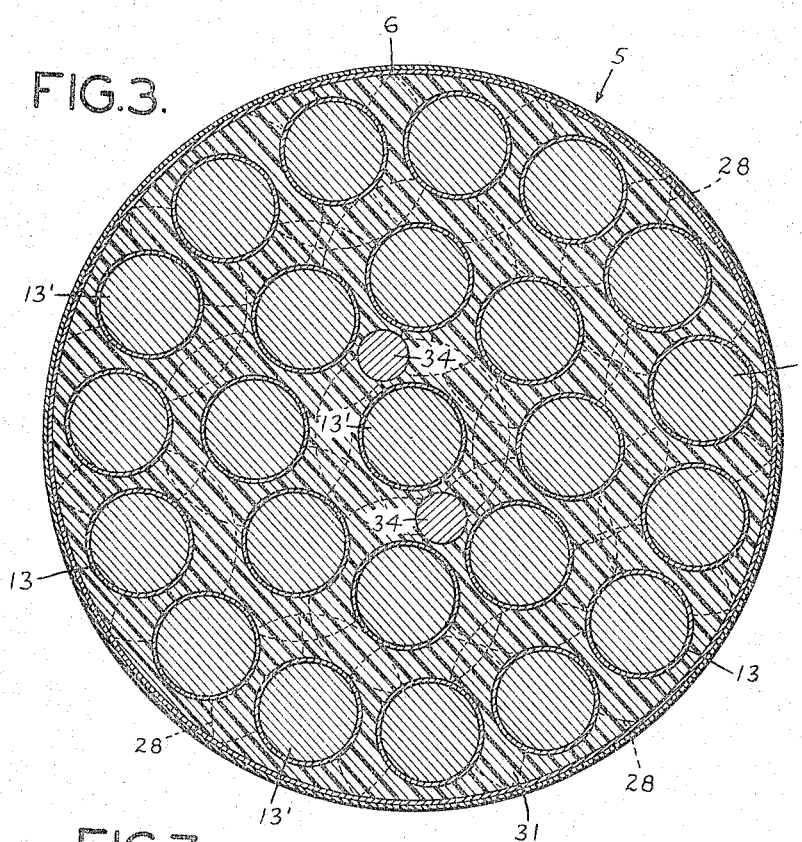
FIG. 3 is a horizontal cross-section taken along the line 3—3 of FIG. 2.

Referring now to the drawings, the invention as illustrated is embodied in a multi-cell battery pack generally indicated at 5 including a cylindrical body shell 6 formed from thin plywood or other suitable material. The height of the shell 6 is somewhat greater than the height of the battery cells contained therein, and its diameter is slightly more than twice its height.

The bottom of the shell 6 is sealed by a disc 7 of suitable material, e.g., marine plywood faced on both sides as at 8, 8 with a layer of resin impregnated 10 oz. glass fiber cloth. An inner disc 9 formed from 3 plies of 19 oz. resin impregnated glass fiber cloth is bonded onto the upper face of the disc 7.

A lower battery cell spacing disc 10 formed from marine plywood faced on both sides as at 11, 11 with resin impregnated glass cloth overlies the disc 9, and in the illustrated embodiment of this invention, is provided with a total of 24 circular apertures 12 arranged in concentric circles (see FIG. 3) to hold the individual battery cells in the desired spaced relationship.

Figure 7:
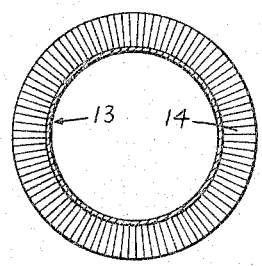
FIG. 7 is a fragmentary horizontal section taken along the line 7—7 of FIG. 6 and shows the manner in which the ends of the glass cloth tubes are flared or feathered to form a flange.
Figure 8:
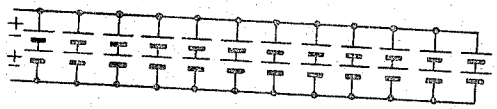
FIG. 8 is a schematic wiring diagram for this particular battery pack.

Referring particularly to FIGS. 2 and 6 of the drawings it will be seen that the lower portion of a two ply resin impregnated glass fiber tube 13 is inserted through each aperture 12 in the spacing disc 10; and the lower end of each of the tubes 13 is frayed or feathered outwardly to form a bottom flange 14 (see FIG. 7) which becomes sandwiched between the under face of the disc 10 and the upper face of the disc 9. A foamed polystyrene cushioning pad 15 is positioned at the bottom of each tube 13.

Figure 4:
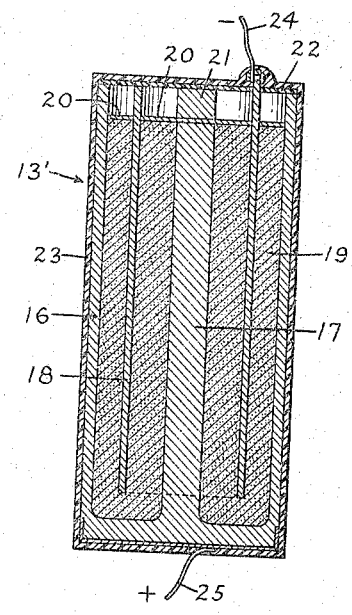
FIG. 4 is a vertical cross-section of a typical unit cell that is particularly adaptable for use in the battery pack of this invention.

Each of the tubes 13 holds a single primary battery cell 13′ preferably of the so-called "inside-out" construction such as disclosed and claimed in U.S. Patent 2,903,499 granted to R. R. Balaguer on Sept. 8, 1959. Typically, each cell will be of the No. 6 size, but other sizes may, of course, be used. One suitable type cell of such construction is illustrated in vertical section in FIG. 4 of the drawings and includes a cathode comprising a carbon cup 16 having an axial integral carbon rod 17, an annular magnesium anode 18, battery mix 19, paraffine coated paper separator washers 20, 20, a balsa wood spacer 21, a resin impregnated glass fiber cloth top 22, a relatively heavy resin impregnated glass fiber cloth casing 23, a negative lead wire 24 and a positive lead wire 25.

After the primary cells have been positioned within the tubes 13 with the lead wires 24 and 25 extending into the void spaces between the tubes, foamed polystyrene cushioning pads 26, identical to the pads 15 are placed over the tops of the cells.

An upper battery cell spacing disc 27, substantially identical to the lower disc 10, is fitted over the upper end portions of the tubes 13 which have their ends flared or frayed outwardly to form flanges 28 overlying the upper face of the disc 27.

An inner disc 29, substantially identical to the disc 9 overlies the spacing disc 27 and is in turn covered by a top closure disc 30 substantially identical to the bottom disc 7.

The entire void space defined by the shell 6, the discs 9 and 29 and the outer walls of the tubes 13 is filled by a suitable cushioning material 31 such as polyurethane foam, preferably foamed in situ in order to be sure of properly filling the entire void.

By reference to FIGS. 3 and 5 of the drawings, it will be seen that two holes are cut through the top disc 30, the inner disc 29 and the top spacing disc 27 to each receive a resin impregnated glass fiber cup 32 having a mounting flange 33. Suitable brass connecting hardware 34 extends through the cup 32 using watertight fittings.

Prior to the introduction of the cushioning material 31 the necessary inter battery cell connections are made and the resultant free leads are connected to the appropriate terminal hardware 34. FIG. 6 of the drawings shows the schematic wiring diagram for the illustrated embodiment of this invention in which there are twelve parallel connected sets of two series-connected cells, and thus mechanically there are twelve positive leads connected to one terminal 34 and twelve negative leads connected to the other terminal 34.

Following completion of assembly the shell 6 is encased by a relatively heavy multi-ply wrapper 35 of resin impregnated glass fiber cloth having inturned flanges 36, 36.

It is contemplated that the assembly of these battery packs will take place before the impregnating resins of the various glass cloth components have had time to appreciably cure so that final curing occurs after assembly in order that the entire structure may become bonded together as a single mechanically strong, impact resistant watertight unit.

In this type of construction the individual battery cells never contact any rigid part of the structure, and thus the cushioning effect of the pads 15 and 26 and the void cushioning 31 will remain undiminished whenever the whole unit is subjected to violent impact.

While the invention has been described in connection with a specific embodiment thereof and in a specific use, various modifications thereof will occur to those skilled in the art without departing from the spirit and scope of the appended claims.

What is claimed is:

1. A battery pack for a plurality of individual primary cells including a tubular shell having a height greater than the height of an individual cell, an imperforate closure for the bottom of said shell, a perforated bottom spacer overlying said bottom closure, a plurality of cell-containing tubes fitted into the perforations of said bottom spacer, cushioning means positioned at the bottoms of said tubes for maintaining the cells carried therein above the top of said bottom spacer, a perforated top spacer engaged with the tops of said tubes at a level above the tops of the cells carried therein, cushioning means positioned at the tops of said tubes for restraining said cells against upward vertical movement, and an imperforate closure for the top of said shell.

2. A battery pack for a plurality of individual primary cells including a tubular shell having a height greater than the height of an individual cell, an imperforate closure for the bottom of said shell, a perforated bottom spacer overlying said bottom closure, a plurality of cell-containing tubes fitted into the perforations of said bottom spacer, cushioning means positioned at the bottoms of said tubes for maintaining the cells carried therein above the top of said bottom spacer, a perforated top spacer engaged with the tops of said tubes at a level above the tops of the cells carried therein, cushioning means positioned at the tops of said tubes for restraining said cells against upward vertical movement, and means for waterproofing said shell and said closures.

3. A battery pack for a plurality of individual primary cells including a tubular shell having a height greater than the height of an individual cell, an imperforate closure for the bottom of said shell, a perforated bottom spacer overlying said bottom closure, a plurality of cell-containing tubes fitted into the perforations of said bottom spacer, cushioning means positioned at the bottom of said tubes for maintaining the cells carried therein above the top of said bottom spacer, a perforated top spacer engaged with the tops of said tubes at a level above the tops of the cells carried therein, cushioning means positioned at the tops of said tubes for restraining said cells against upward vertical movement, and means contained within the voids between said tubes for cushioning said tubes against the effects of lateral impact.

4. An impact resistant battery pack for a plurality of primary cells including a tubular shell having a height greater than the height of an individual cell, an imperforate closure for the bottom of said shell, a perforated bottom spacer overlying said bottom closure, a plurality of cell-containing tubes fitted into the perforations of said bottom spacer with their vertical axes in spaced parallel alignment, cushioning means positioned at the bottoms of said tubes for maintaining the cells carried therein above the top of said bottom spacer, a perforated top spacer engaged with the tops of said tubes at a level above the tops of the cells carried therein, cushioning means positioned at the tops of said tubes for restraining said cells against upward vertical movement, an imperforate closure for the top of said shell, terminals carried by said top closure and electrically connected to said cells in accordance with a predetermined wiring arrangement, and means substantially filling the voids between said tubes and between said tubes and said shell for cushioning said tubes against the effects of lateral impact.

5. The battery pack of claim 4 in which the shell is annular and in which the perforations of said bottom and top spacers are arranged in concentric circles whereby to maintain tube-to-tube and tube-to-shell spacing.

6. The battery pack of claim 4 in which the void filling means comprises a plastic foamed in situ.

References Cited by the Examiner

UNITED STATES PATENTS 2,185,829   1/1940   Burgess ------------ 136—108

WINSTON A. DOUGLAS, *Primary Examiner.*

D. L. WALTON, *Assistant Examiner.*